United States Patent [19]

Benze

[11] Patent Number: 5,231,943
[45] Date of Patent: Aug. 3, 1993

[54] SAIL PLAN FOR SAILING CRAFT

[76] Inventor: Theodore A. Benze, 405 N. Bridge St., Elkton, Md. 21921

[21] Appl. No.: 881,158

[22] Filed: May 11, 1992

[51] Int. Cl.5 ............................................. B62H 9/10
[52] U.S. Cl. ................................... 114/39.1; 114/89; 114/97; 114/102; 114/104
[58] Field of Search ..................... 114/39.1, 39.2, 89, 114/90, 102, 103, 104, 97

[56] References Cited

U.S. PATENT DOCUMENTS

| | | | |
|---|---|---|---|
| 2,893,339 | 7/1959 | Ram | 114/39.1 |
| 3,173,395 | 3/1965 | Laurent | 114/39.1 |
| 3,195,494 | 7/1965 | Robin | 114/39.1 |
| 4,263,861 | 4/1981 | Vicard | 114/39.1 |
| 4,449,468 | 5/1984 | Schulz et al. | 114/97 |
| 4,603,648 | 8/1986 | Berge | 114/39.1 |

Primary Examiner—Jesus D. Sotelo
Assistant Examiner—Stephen P. Avila
Attorney, Agent, or Firm—Leonard Bloom

[57] ABSTRACT

A plan for a sail of a sailing craft such as a sailboat, an iceboat and a land yacht having a hull. At least one mast is mounted on an end of the hull and the mast angles upwardly over the hull. A boom is pivotably mounted approximately amidships of the hull. The boom is rotatable through 360° about the mounting point, and the ends of the boom avoid contact with the at least one mast. A triangular sail has a lower edge connected to the boom and an upper corner releasably connected to the top of the at least one mast. The boom, preferably, has an upper member and a lower member. The upper member is rotatable, and the sail may be roller reefed about the upper member. A steering system for the vehicle is provided which is collocated with the controls for the sail whereby the vehicle may be controlled by one individual at a single location. In a catamaran type sailboat, a control ring is connected to the boom whereby pivotal and rotational movement of the sail may be controlled by a person seated on the hull.

33 Claims, 9 Drawing Sheets

SAIL PLAN FOR SAILING CRAFT

The present invention concerns a sail plan for a sailing craft such as a sailboat, an ice boat, a land yacht or the like and in particular for a sailing craft having a triangular sail mounted on a boom and rotatable about a vertical axis through 360°.

BACKGROUND OF THE INVENTION

The art of sailing has been practiced for thousands of years and is generally well known throughout the world. Most sailing craft utilize one or more masts which project upwardly from the hull and have at least one sail attached thereto. In small boats which are operated by one person, the need to constantly adjust the setting of the sail with respect to the direction of the wind while controlling the rudder and handling the various lines associated with the boom and the sail, is a difficult and strenuous operation.

Various sails and mast configurations have been proposed and used to attempt to simplify the operation of sailing craft and/or to improve the efficiency of the sailing craft. The applicant is aware of the following which are considered pertinent to the present application.

| Inventor | U.S. Pat. No. |
|---|---|
| Bell | 24,090 |
| Norcross | 163,940 |
| Ljungstrom | 1,375,400 |
| Ryder | 2,147,501 |
| Szakacs | 2,724,356 |
| Laurent | 3,173,395 |
| Robin | 3,195,494 |
| Hiscock | 3,693,571 |
| Jamieson | 4,044,702 |
| Berge | 4,603,648 |
| Stampe | 4,723,498 |
| Biagioli | 4,922,846 |

Bell discloses a shortened mast bench set at a greater than standard angle to the horizontal plane. A spar having upwardly curved ends is secured to the mast. The mast is connected to the mast bench. A single sail or separate sail may be fitted to the mast.

Norcross discloses a mast composed of two or more timbers which are joined at their tops by a common cap. The bottoms of the masts are mounted to a revolving platform which is received in a socket in the deck.

Ljungstrom discloses a mast which can be inclined together with the sail, either ahead or astern in the longitudinal direction of the boat. The lower end of the mast is attached to rollers running on a curved bar.

Ryder discloses a triangular sail which is rotatable 360° about a single center mast, mounted amidship. The mast is an assemblage of several parts.

Szakacs discloses a single curved mast mounted on the stern of the boat. A triangular sail is attached to the mast. The sail is framed by a strip of wood on the foot and by steel cables on the sides.

Laurent discloses a triangular sail mounted to a center mast of a catamaran and rotatable 360° about the mast. The mast is supported by shrouds which are mounted fore and aft. The rudders and the sail are controlled from the center of the boat.

Robin discloses a sail control for vessels wherein a sail rig includes a flexible sail membrane, drawn taut within a triangular, peripheral frame by means of cables and operated by winches. The sail may rotate through 360°. The frame is connected to the hull and is slidably mounted on guide rails. The frame may also pivot about a base.

Hiscock discloses a sail rig for many types of vessels including a monohull, a catamaran, a trimaran, a hydrofoil, an ice boat, and a land yacht. The sail is symmetrical and is a spherical isosceles triangle with a curved leach, a curved luff, and a curved foot. A boom is provided to swing freely about the lower end of the luff spar, and a sail is mounted with its foot adjacent to the boom and its luff adjacent to the luff spar.

Jamieson discloses a single sail suspended at its head from the apex of a tripod mast. The foot of the sail is attached to a spar. The spar is rotatably mounted atop a stub mast which is centrally located with respect to the tripod mast.

Berge discloses a catamaran type sailboat with several inclined mast-like elements which have a common upper connection. The masts are pivotable at their lower ends.

Stampe discloses two masts with a common thwartships plane which are joined at a mast head. Each mast is provided with a respective main boom and two main sails.

Biagioli discloses a masting which comprises three (3) poles to form a pyramid with a triangular base and connected upper ends at the vertex. The masting also comprises a plurality of stays to which sails are applied. The boat may be a catamaran.

Thus, despite interest in sails over a period of many years, there still exists a need for a simple system for a sail which enables a sailing craft to be operated by one individual with a minimum of effort and which provides increased maneuverability to the sailing craft.

SUMMARY OF THE INVENTION

A principal object of the invention is to provide a plan for a sail on a sailing craft which provides increased maneuverability to the sailing craft.

It is a further object of the present invention to provide a plan for a sail on a sailing craft in which a triangular sail is mounted from the top of at least one mast, the lower edge of the sail being connected to a boom wherein the boom and the sail may rotate through 360°, and the ends of the boom and the sail avoid contact with the mast.

It is another object of the present invention to provide a plan for a sail on a sailing craft, wherein the lower edge of a triangular sail is connected to a boom, the boom being pivotable about a midpoint wherein pressure on the edges of the sides of the sail can be equalized.

It is still another object of the present invention to provide a plan for a sail on a sailing craft wherein the boom comprises two parallel members and means to roller reef the sail about one of the members of the boom.

It is a further object of the present invention to provide a plan for a sail which may be used on a sail boat, an ice boat and a land yacht.

It is yet another object of the present invention to provide a plan for a sail on a sailing craft, wherein means are provided to move the top of the mast in a forward and an aft direction.

It is still a further object of the present invention to provide a plan for a sail on a catamaran type sailboat wherein a control ring is connected to the boom whereby pivotal and rotational movement of the sail may be controlled by a person seated on the hull.

In accordance with the teachings of the present invention, there is disclosed a plan for a sail on a sailing craft having a hull such as a sailboat, an ice boat, a land yacht and the like. The hull has a first end, a second opposite end in a longitudinal plane with the first end and an amidships between the first end and the second end. The plan includes a mast having a bottom and a top. The bottom of the mast is mounted near the first end of the hull, and the mast is angled upwardly therefrom, wherein the top of the mast is approximately above the amidships of the hull. Support means are provided to connect the top of the mast to the hull for further support for the mast. A boom is provided having a length, a first end, a second end and a midpoint. The midpoint of the boom is rotatably mounted approximately amidships of the hull, wherein the boom is disposed between the support means and the mast and may rotate about a vertical axis through 360° in a plane parallel to the plane of the hull. In this manner, the ends of the boom avoid contact with the support means and the mast. A triangular sail is provided having side edges, a bottom edge and an upper corner between the side edges. The bottom edge of the sail is connected to the boom. The upper corner of the sail is releasable connected to the top of the mast wherein the sail may be raised and lowered with respect to the top of the mast. The support means may be a second mast having a bottom and a top. The bottom of the second mast is mounted near the second end of the hull and angles upward therefrom such that the top of the second mast is joined to the top of the first mast at a juncture above the hull. In an alternate embodiment, the support means includes a sprit extending outwardly from the first end of the hull, a stay having a first end connected to the sprit and a second end connected to the top of the mast to support the mast. In this manner, the stay may be tightened and loosened to permit adjustments to the mast. A cable having a first end is connected to the second opposite end of the hull and a second end of the cable is connected to the top of the mast to further support the mast.

A means for steering the sailing craft in a desired direction is provided which includes a first control means for controlling the means for steering the sailing craft and a second control means for controlling the rotation of the boom and the sail connected thereto. Both of said control means are disposed at a single location on the hull whereby the sailing craft may be sailed by a single sailor from said location.

The sail has a first corner (clew) and a second corner (tack) adjacent to the bottom edge of the sail, the first corner or the sail is movable laterally and is connected to the first end of the boom. The second corner of the sail is movable laterally and is connected to the second end of the boom, wherein the bottom edge of the sail is disposed along the length of the boom. The midpoint of the boom is further pivotably mounted approximately amidships of the hull, whereby the boom may pivot above and below the plane parallel the plane of the hull throughout the 360° of rotation of the boom. The boom has an upper member and a substantially parallel lower member, the members being connected at the respective ends of the boom. At least one side of the sail is releasable connected to the upper member of the boom.

In another embodiment, the sailing craft is a catamaran type sailboat. A control ring is connected to the boom, and pivotal and rotational movements of the sail may be controlled by a person seated on the hull of the sailing craft.

These and other objects of the present invention will become apparent from a reading of the following specification, taken in conjunction with the enclosed drawings.

DESCRIPTION OF THE PREFERRED EMBODIMENTS

Referring now to the FIGS. 1-8, the sailboat 11 has a hull 12 which has a bow 13 and a stern 14 in the longitudinal plane of the hull 12 and an amidships 15 between the bow 13 and the stern 14. A forward mast 16 is mounted near the bow 13 of the hull 12, and an aft mast 17 is mounted near the stern 14 of the hull 12. Both masts 16,17 are mounted in a manner so that the tops of the masts are angled inwardly, and the respective tops 18 of the masts 16, 17 are joined at a juncture at a point above the hull 12. Preferably, each mast 16,17 further has a cross member 19 attached thereto between the hull 12 and the top 18. The cross member 19 is substantially perpendicular to the respective mast 16,17 and the ends extend outwardly from each mast 16,17 toward the port and starboard sides such that the cross members 19 are substantially parallel to the plane of the hull 12. To support the masts 16,17, stays 20 are connected to each mast. One end of each stay 20 is connected to the top 18 of the respective mast 16,17, and the intermediate section of the stay 20 is attached to the end of the respective cross member 19. The other opposite ends of the respective stays 20 are connected to the hull 12 at the port and starboard edges of the hull 12 adjacent to the mounting of the respective forward and aft masts 16,17. In this manner, the masts 16,17 are securely supported to the hull 12.

Figure 1:
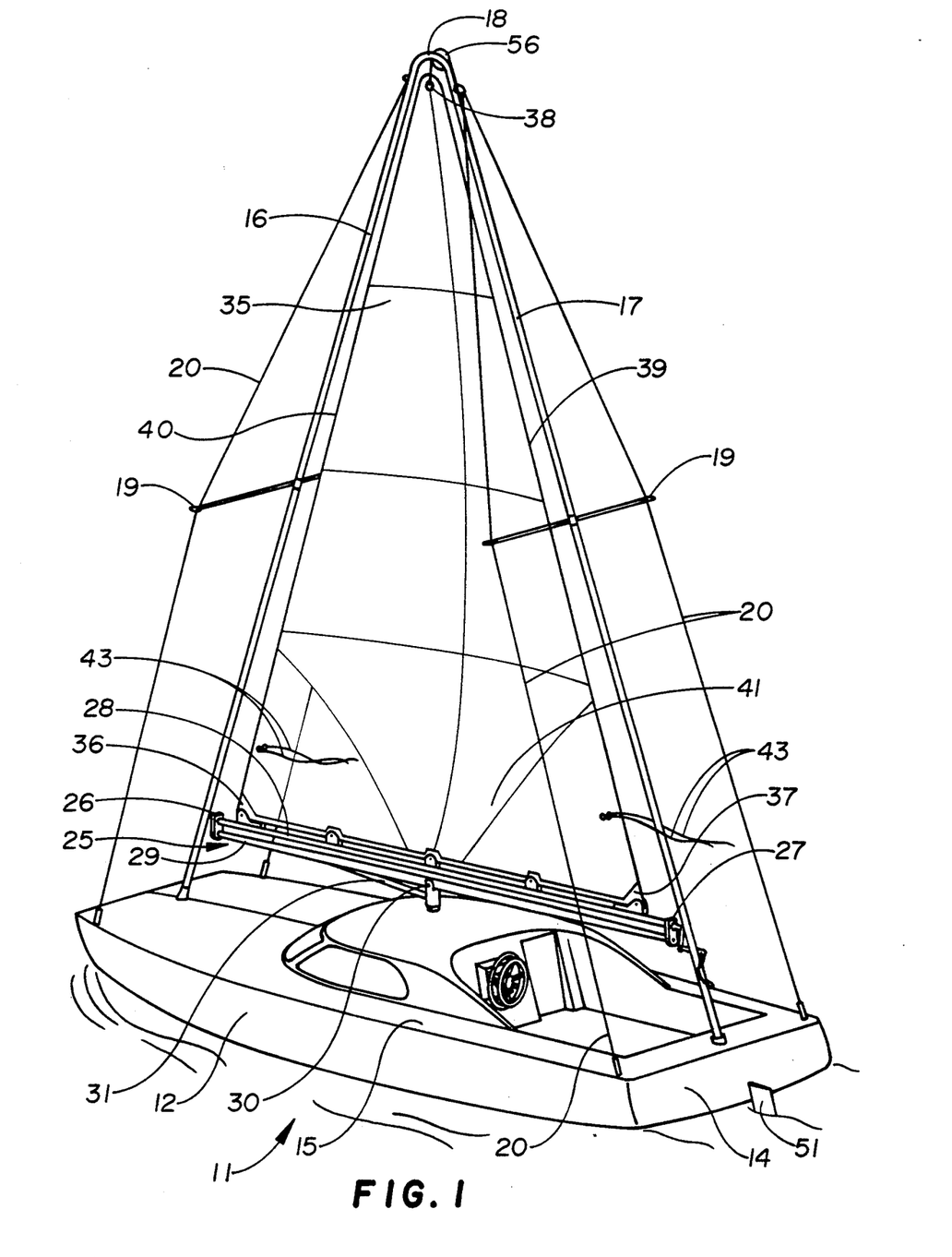
FIG. 1 is a perspective view of a sailboat having the sail plan of the present invention.
Figure 2:
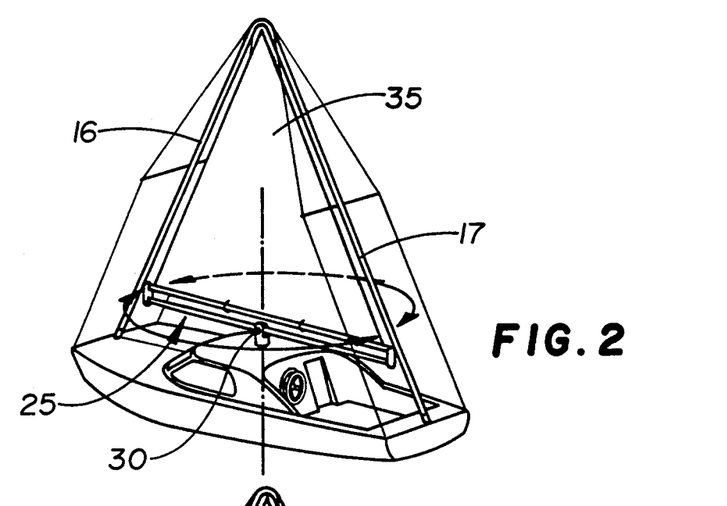
FIG. 2 is a perspective view of a sailboat showing 360° rotation of the sail of the present invention.
Figure 3:
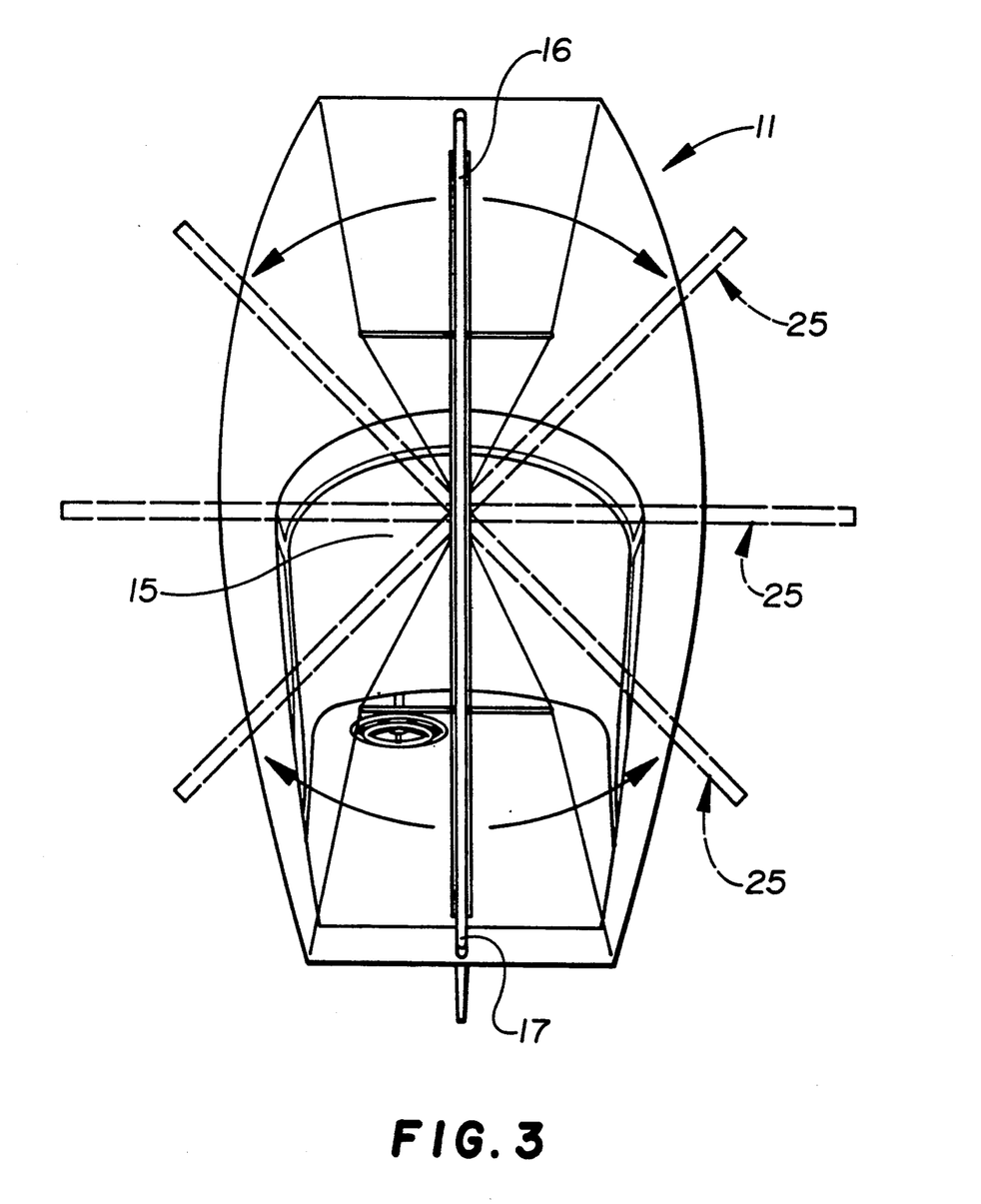
FIG. 3 is a top plan view showing 360° rotation of the sail having the rotational positions in phantom lines.
Figure 4:
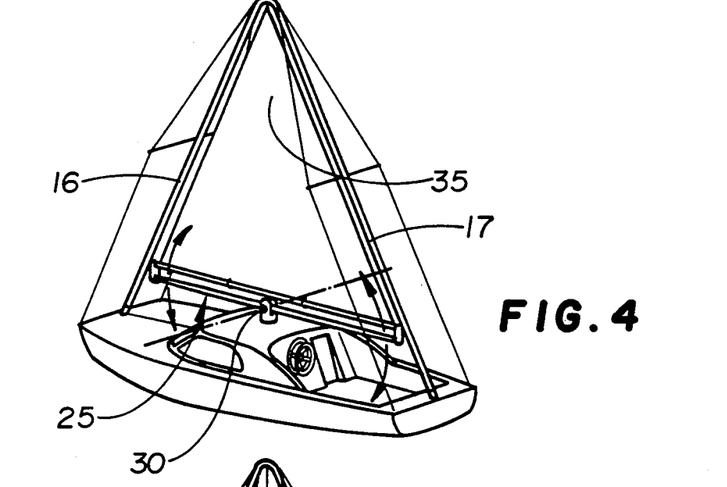
FIG. 4 is a perspective view of a sailboat showing pivotal mounting of the boom of the present invention.

A boom 25 having a first end 26 and a second end 27 is mounted approximately amidships 15 of the hull 12. The mounting is also approximately at the midpoint between the port and starboard sides of the hull 12. The midpoint of the boom 25 is rotatably mounted on the hull 12 in a manner whereby the boom 25 may rotate about a vertical axis through 360° in a plane parallel to the plane of the hull. The length of the boom 25 is less than the distance between the masts 16,17 in the plane of rotation such that the ends 26,27 of the boom 25 avoid contact with the masts 16,17 (FIGS. 2,3). In a preferred embodiment, the boom 25 is formed of an upper member 28 and a lower member 29 which are connected at the ends thereof so that the ends of the respective members 28,29 are also the ends 26,27 of the boom 25. The midpoint of the boom 25 is further pivotally mounted at the point 30 at which the boom 25 is rotatably mounted. In this manner, the boom 25 may also pivot above and below plane parallel to a the plane of the hull 12 throughout the entire 360° rotation of the boom 25 (FIG. 4).

A boom vang 31 may be connected between the boom 25 and the axle 47. The boom vang 31 is an adjustable connector which may be tightened or loosened. The boom vang 31 limits the movement of the boom 25 and the sail 35 attached thereto in both the rotational and the pivotal modes. The boom vang permits the shape of the sail 35 to be controlled since, when secured in a desired position by the boom vang 31, the amount of air being spilled from the sail 35 can be controlled.

Figure 5:
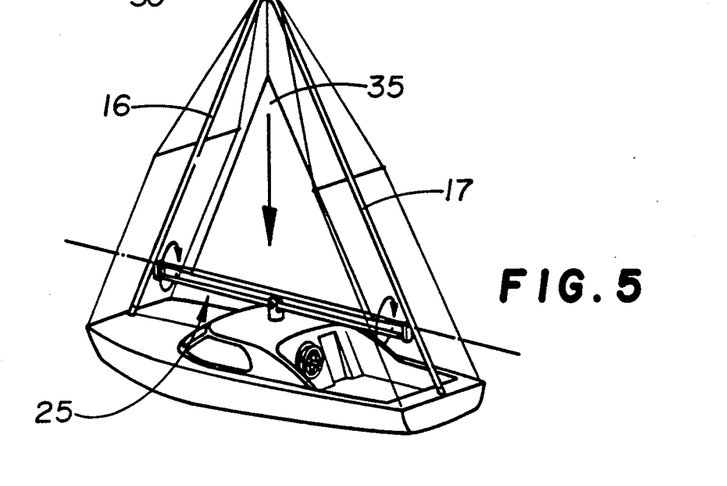
FIG. 5 is a perspective view of a sailboat showing lowering of the sail of the present invention.
Figure 6:
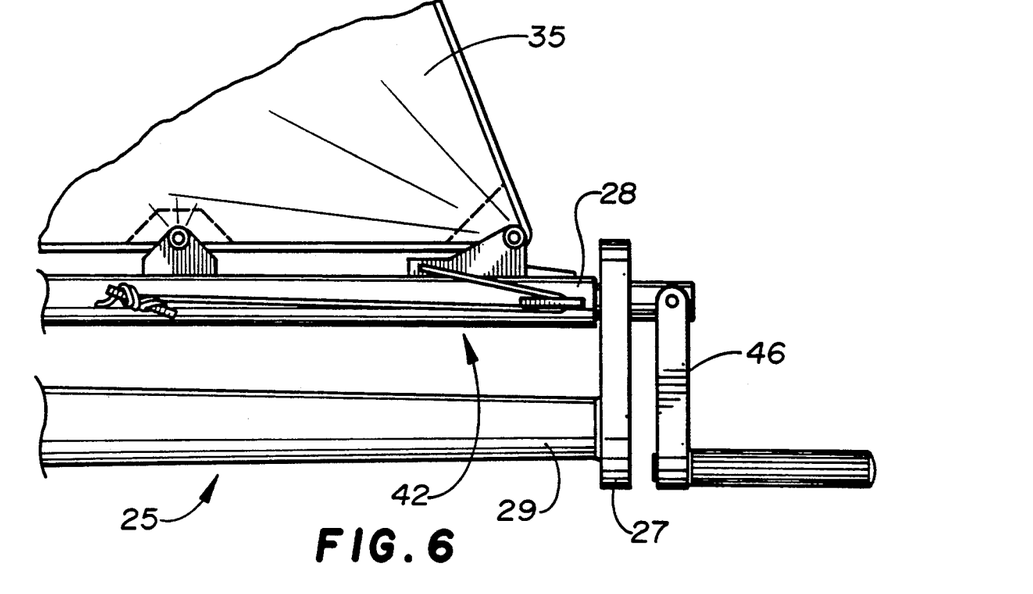
FIG. 6 is a side view showing outhauling of the corner of the sail.
Figure 7:
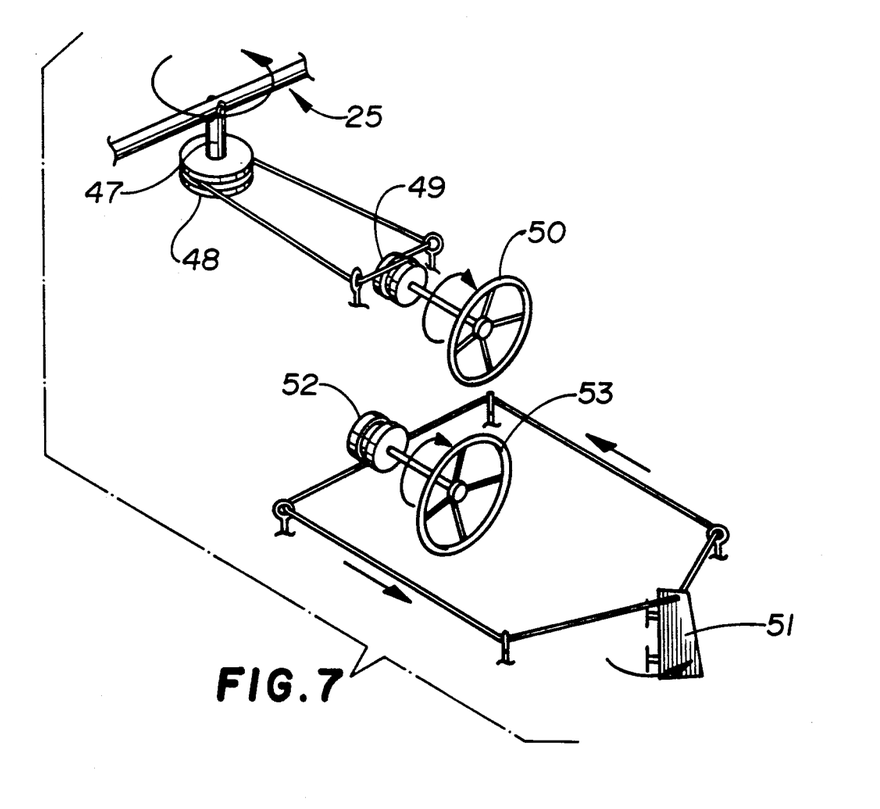
FIG. 7 is a perspective view showing a single axle double-wheel helm to control the boat.
Figure 8:
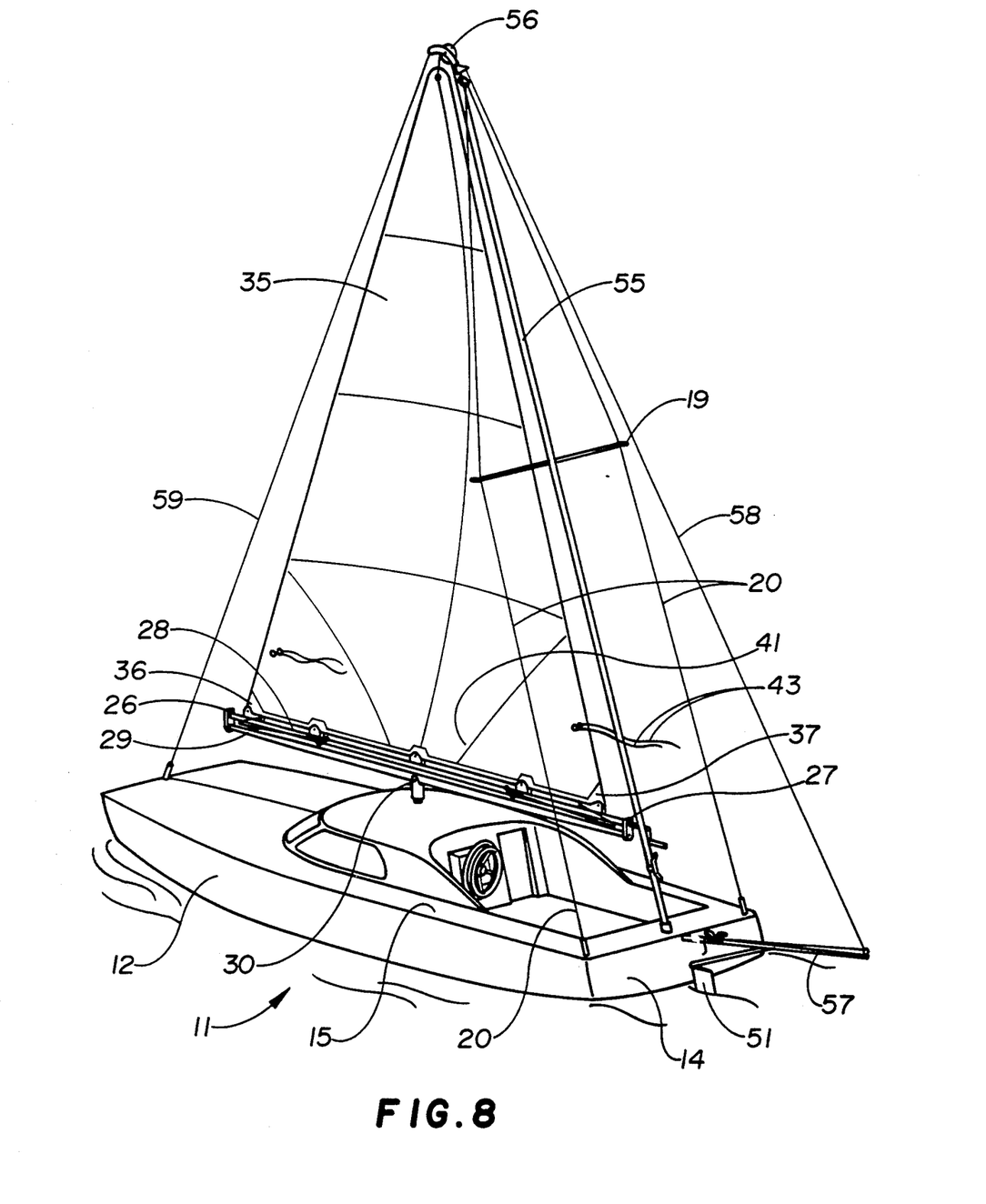
FIG. 8 is a perspective view of an alternate embodiment of the present invention wherein a sailboat has a single mast.

A triangular sail 35 having a first corner 36, a second corner 37, a third corner 38, and side edges 39,40 is mounted on the boom 25. The sail 35 is made of fabric, polyester, or similar material commonly used on sail boats or wind-powered vehicles. The foot 41 of the sail 35 is the side of the sail 35 which is between the first corner 36 and the second corner 37 and is disposed adjacent to the length of the boom 25. The third corner 38 of the sail 35 is movably mounted to the juncture at the top 18 of the masts 16,17 in a manner whereby the third corner 38 of the sail 35 can be raised and/or lowered (FIG. 5). The first and second corners 36,37 of the sail 35 are movable laterally and are connected to the respective first end 26 and second end 27 of the boom 25 by outhauls 42 as ar known to persons skilled in the art (FIG. 6). Preferably, the corners 36,37 of the sail 35 are attached to outhauls 42 on the upper member 28 of the boom 25. The lateral movement of the corners of the sail 25 permits the sailor to set the bag of the sail 25 by having a greater or lesser cup in the sail.

A pulley means is preferably mounted at the top 18 of the mast 12 and a halyard 45 is passed through the pulley. One end of the halyard 45 is connected to the third corner 38 of the sail and the halyard 45 is disposed along the mast, preferably the aft mast 17. The opposite end of the halyard 45 is releasably wrapped about a cleat or the like, preferably mounted on the mast 17 near the hull 12 so that the sailor may rapidly and easily be able to raise and/or lower the sail 35 by pulling or releasing the halyard 45.

When the sail 35 is lowered, it is reefed on the boom 25. It is preferred that the sail 35 be roller reefed about the upper member 28 of the boom 25. The upper member 28 of the boom 25 is rotatable, and a crank 46 is provided on the end of the boom 25 to enable the sailor to rapidly and easily roll the upper member 28 of the boom 25 so that the sail 35 may be rolled about the boom 25.

In a preferred embodiment, the boom 25 is connected to an axle 47 which has a drum means 48 mounted on the lower end thereof. The drum means 48 is connected to a sailwheel drum 49 by cables whereby rotation of the sailwheel drum 49 causes rotation of the drum means 48, the axle 47, the boom 25 and the sail 35. For ease of steering, a sailwheel 50 is connected to the sailwheel drum 49. The sailwheel 50 is turned by the sailor as required to permit rapid and easy rotational movement of the sail 35 through 360°.

The rudder 51 which is the steering means for the sailboat preferably is connected to a rudder drum 52 by cables whereby rotation of the rudder drum 52 causes rotation of the rudder 51. The rudder drum 51 is connected to a rudder wheel 53 which may be turned by the sailor as required for steering of the boat. (FIG. 7) Other means of interconnecting the axle 47 and the sailwheel 50 and the rudder 51 to the rudder drum 51 may be used, as are known to persons skilled in the art. These may be belts, chains, gears, hydraulic plans, etc.

The sailwheel 50 and the rudder wheel 53 are preferably collocated at a single point or in close proximity to on another whereby the sailor may easily control the vehicle from a single location on the hull 12. A preferred location is approximately amidships 15 but other locations may be used.

The rudder wheel 53 and sailwheel 50 may be mounted on concentric shafts so that one wheel is disposed immediately in front of the other wheel to further permit control of the vehicle from a single location.

With the controls of the present invention, there is no necessity to have lines and winches for effecting these controls resulting in the advantage of having clear decks on the boat and reducing the weight of the boat, in addition to the advantage of one-person operation from a single location.

Still a further advantage of the present invention is the ability to equalize pressure on the side edges 40 of the sail 35 by pivoting the sail 35 about the point 30.

When the wind is caught by the sail 35, the wind increases pressure on one of the side edges 40 of the sail. It is often desirable to alter the pressure either to change the course of the vehicle or for more efficient sailing. The ability of the plan of the present invention to pivot the boom 25 greatly increases the ease with which the change in pressure can be achieved. When the boom 25 and the lower edge of the sail 30 attached thereto is pivoted, the end of the boom which is distal from the top 18 of the mast induces increased pressure on the corresponding edge of the sail 35. Thus, the sailor can determine which edge of the sail 35 is to have decreased pressure or decreased pressure applied thereto to balance the pressure being caused by the wind.

In an alternate embodiment (FIG. 8), a single mast 55 is mounted on the hull 12 of the sailboat 11, preferable being mounted on the stern 14. The mast 55 is angled upwardly over the hull 12 such that the top 56 of the mast is above the hull 12 and approximately amidship thereof. A sprit 57 is mounted on the hull 12 and extends outwardly from the hull 12. When the single mast 55 is mounted on the stern 14, the sprit 57 is a stern sprit; and when the mast is mounted on the bow 13, the sprit 57 is a bow sprit. A first cable (or stay 58) has a first end connected to the sprit 57 and a second end connected to the top 56 of the mast 55 to secure the mast 55. Further, a second cable 59 has a first end connected to the end of the hull 12 opposite to the sprit 57 and a second end connected to the top 56 of the mast 55 to further secure the mast 55 Slight adjustments to the angular disposition of the mast 55 may be made by increasing and/or decreasing the tension of the braces 58,59. Alternately, the first end of the first cable 58 and first end of the second cable 59 may be connected therebetween by third cable 60 in a substantially continuous loop wherein third cable 60 passes approximately amidships 15 of the sailing craft and is readily accessible to the sailor at the control location. The first end of the first cable 58 and the first end of the second cable 59 are slidably connected to the respective ends of the hull. Means such as a gear may be connected to the third cable 60 to permit the sailor to increase tension on the desired first or second cable 58,59 to move the top of the mast 55 forward or aft as desired. This permits additional control of the sail to obtain greater or lesser cupping to spill the wind. The single mast 55 is further secured by a cross member 19 and stays 20 as described above concerning the two-masted embodiment. The mounting of the boom 25 and the sail 35 are substantially the same as described above with respect to the two-masted embodiment.

Figure 9:
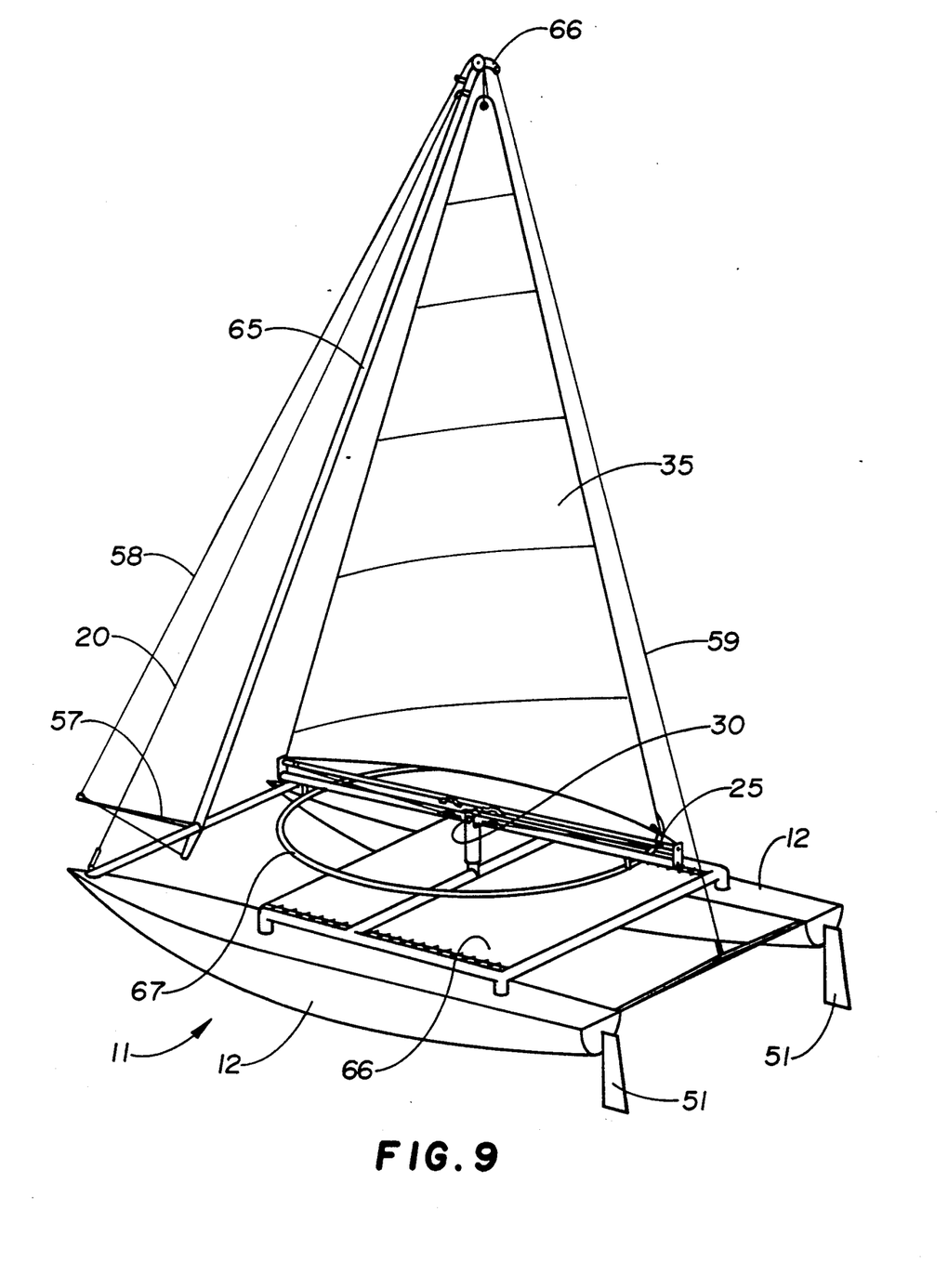
FIG. 9 is a perspective view of the present invention on a catamaran-type sailing boat.

A further embodiment is the use of the system of the present invention on a catamaran-type sailboat (FIG. 9). The term "hull" 12, as used herein, includes the twin hulls of the catamaran and the forward and aft crossbars between the hulls. As with the previously described embodiment, the catamaran may have a single mast 65 angled upwardly over the hull or may have a forward mast and an aft mast which are angled upwardly with the tops 66 of the respective masts 65 joined at a juncture approximately amidship over the hull 12. Stays 20 are connected between the tops 66 of the respective masts 65 and the hull 12, to support the masts 65 as previously described. A sprit 57 may extend outwardly from the hull 12 and a cable 58 may be connected between the sprit 57 and the top of the mast 66 to provide support for the mast 65 as in the previously described embodiment. The boom 25 is mounted approximately amidship in a manner as described above, so that the boom 25 may rotate horizontally about a vertical axis through 360° in a plane parallel to the plane of the hull 12 without the ends of the boom 25 contacting the mast 65 or the stays 20. The boom 25 is also pivotally mounted to permit vertical movement of the boom 25 above and below the plane parallel to the plane of the hull 12 throughout the 360° rotation of the boom 25. The boom 25 may be formed of an upper member and a lower member as previously described. Also, the sail may be roller reefed about the boom 25 in a manner as disclosed above. A control ring 67 is attached to the underside of the boom 25 to permit persons seated at any location on the trampoline 66 to both rotate and pivot the boom 25, and concomitantly the sail 35 attached thereto, to any desired position with respect to the fore and aft axis of the hull 12.

The plan of the present invention may be used on any type of sailing craft which is wind powered and propelled by a sail mounted on a mast. Thus, the plan may be used with an ice boat 70 which has runners 72 affixed to the bottom of the hull to contact the ice. (FIG. 10) Also, the plan may be used with a land yacht 75 (FIG. 11) which has wheels 76 between the hull and the land surface. At least one of the wheels 78 is movable for steering of the land yacht 75.

Figure 10:
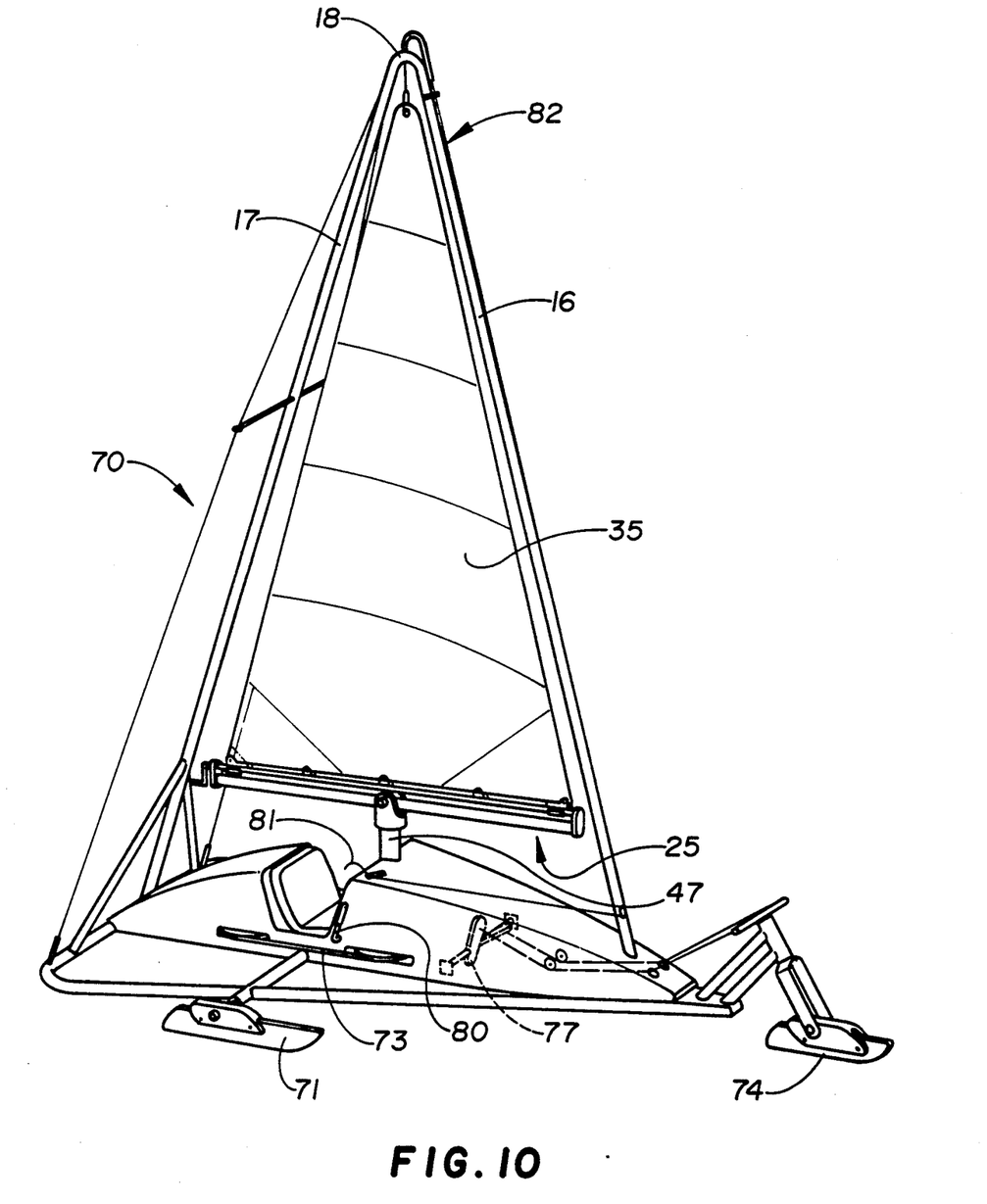
FIG. 10 is a perspective view of the present invention on an land yacht.
Figure 11:
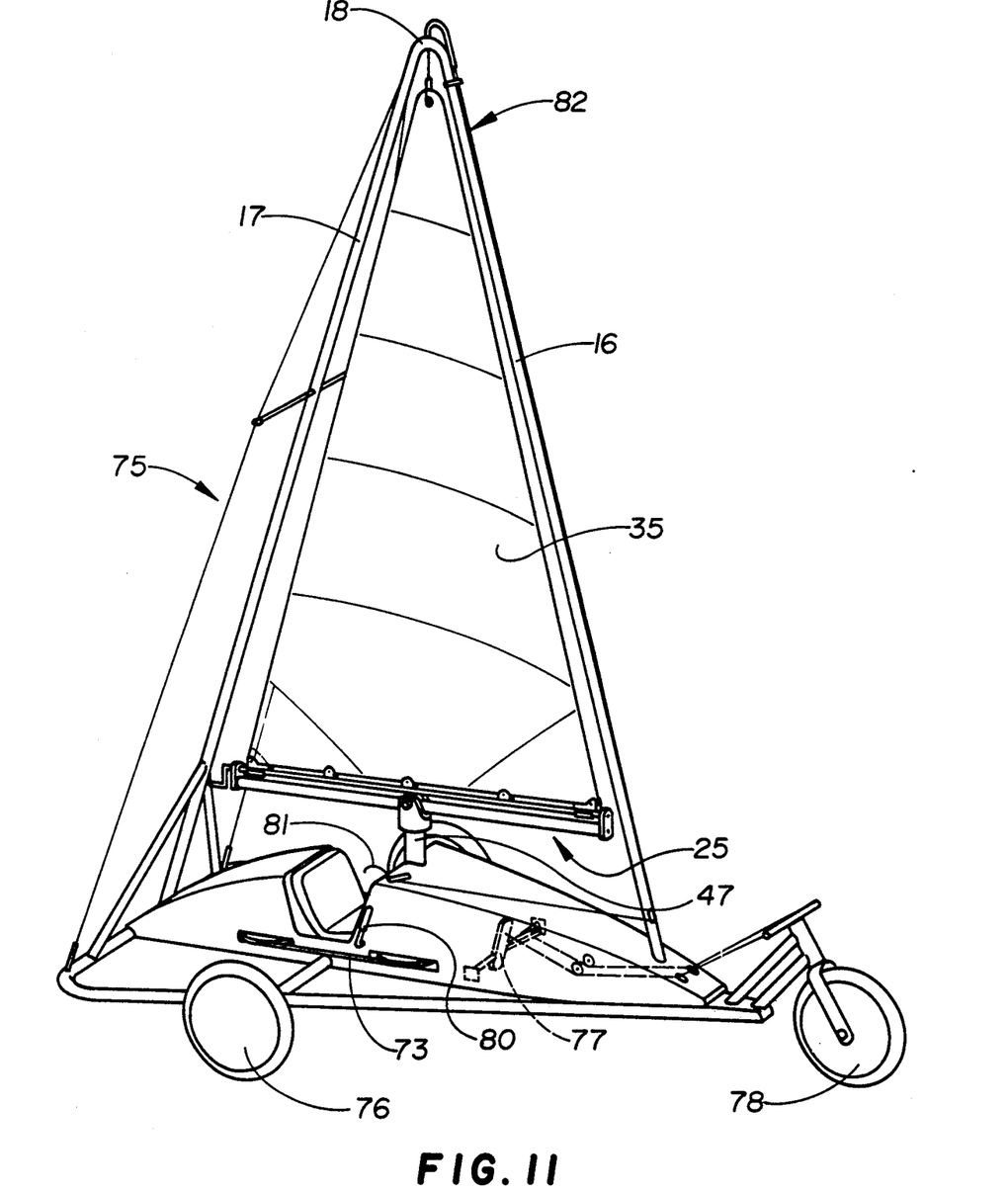
FIG. 11 is a perspective view of the present invention on a iceboat.

In either the ice boat 70 or the land yacht 75, the axle 47 has an upper end connected to the boom 25 and a lower end connected to a line means 73 which may extend along the side of the sailing craft 70,75 adjacent to the operator's seat or may be connected to a steering means on the sailing craft. In any configuration, the operator moves the line means to control rotation of the boom 25 and sail 35 through the desired 360° of rotation. Also, in either the ice boat 70 or the land yacht 75, pedals 77 are mounted in the sailing craft accessible to the feet of the operator. The pedals 77 are connected to the forward runner 74 or forward wheel 78 in front of the sailing craft in a manner whereby the respective runner 74 or wheel 78 can be steered in the desired direction. In addition, both the ice boat 70 and the land yacht 75 have a brake system on the rear runners or rear wheels, respectively, which is hand operated by a brake means 80 (such as a lever) which is readily accessible to the operator. Further, both the ice boat 70 and the land yacht 75 have a jam cleat 81 readily accessible to the operator. The jam cleat 81 is connected to the top of the sail 35 by a halyard 82 and provides a means for emergency release of the sail 35 from the top of the masts 18 when the sailing craft is in a hazardous situation.

Figure 12:
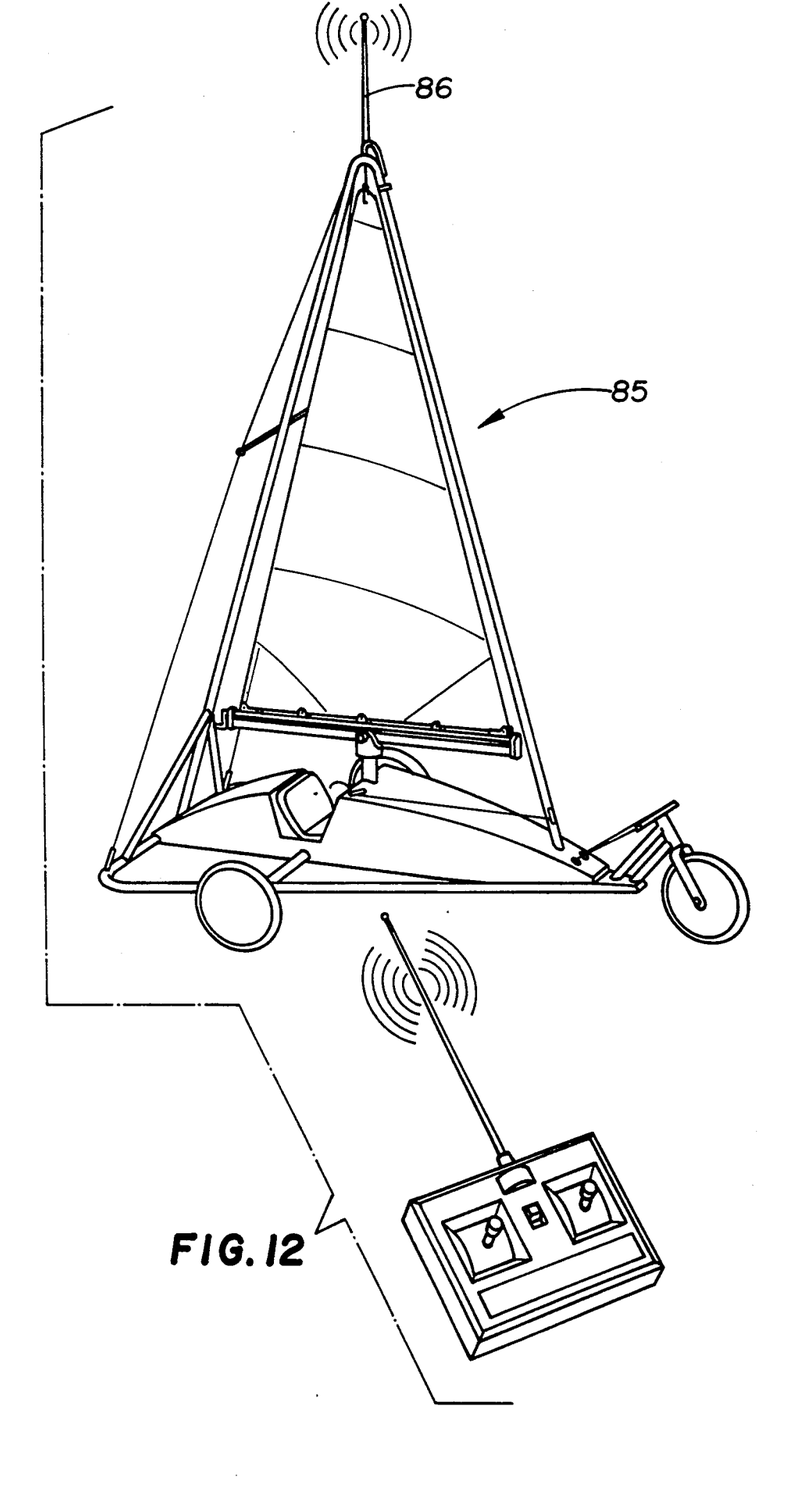
FIG. 12 is a perspective view of the present invention on a radio controlled model.

The plan of the present invention may also be installed on a reduced size model sailing craft 85 which is remotely controlled by radio signals and an antenna 86. The model may be sail boat, an ice boat, a land yacht or the like which has a sail mounted on at least one mast as in the present invention. (FIG. 12) The transmitter, receiver and controls thereof are not included in the present invention.

In all of the usages, the sail 35 may further have transparent portions at the first corner 36 and the second corner 37 thereof. In this manner, tell tales 43 attached on both sides of the sail can be easily seen by the sailor irrespective of the degree of rotation of the sail 35 through the entire 360° range. The tell tales 43 are used by the sailor to determine the wind flow in respect to the set of the sail and to more effectively control the sail for optimum propulsion.

Several significant advantages are derived from the present invention as compared to conventional systems for sailing craft. One major advantage is the ease with which a sailor can change the angle of the sail within 360 degrees without handling winches and sheet lines simply by turning the helm sail or sail control ring. Due to this 360° rotation within the masts, the need to jibe is substantially eliminated. This feature permits the sailing craft to turn much more rapidly, thereby saving time in racing events and reducing stress on the masts and sails. The sailing craft has the ability to sail backwards or to have the effect of braking due to its 360° degree trajectory (or orbit) of the sail. The load on the hull has been placed near the center of gravity, thereby lessening the weather helm.

As a result of the above design, a sailing craft is provided which is sailable by one person from one position amidships. The sailing craft is controlled and turned without stressing the sail and/or mast. The sail can easily be turned to "spill" the wind as desired. No complex, heavy and bulky block and tackle systems are required. The deck area is clear of jib sheet lines and winches when used with a sailboat, pitch, rock, roll and heeling are significantly reduced because the sail is centered on the sailing craft and the load on the edge of the sails is minimized. It is estimated that work required to operate the sailing craft of the present invention, as compared to a conventional sailboat, is reduced by approximately 80%.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A sailing craft having a hull, the hull having a bow and a stern in a longitudinal plane and an amidships between the bow and the stern, the craft comprising:
    a forward mast mounted near the bow of the hull, and aft mast mounted near the stern of the hull, each mast having a respective top, both masts angled inwardly wherein the top of the forward mast and the top of the aft mast are joined at a juncture above the hull;
    a boom having a length, a first end, a second end and a midpoint, the midpoint of the boom being rotatably mounted approximately amidships of the hull, wherein the boom is disposed between the forward mast and the aft mast and may rotate about a vertical axis through 360° in a plane parallel to the plane of the hull, so that the ends of the boom avoid contact with the masts;
    a substantially triangular sail having side edges free of attaching means to the mast, a foot, a first corner, a second corner and a third corner, the foot of the sail being defined between the first corner and the second corner of the sail, the first corner of the sail being movable laterally and being connected to the first end of the boom, the second corner of the sail being movable laterally and being connected to the second end of the boom, the foot of the sail having a midpoint, said midpoint being substantially collocated with the midpoint of the boom wherein the foot of the sail is disposed along the length of the boom symmetrically about the vertical axis, means for movably mounting the third corner of the sail at the juncture at the top of the masts, wherein the sail may be raised and lowered with respect to the top of the mast, and means for reefing the sail to the boom.

2. The sailing craft of claim 1, wherein the boom comprises an upper member and a substantially parallel lower member, the members being connected at the respective ends of the boom, the first and second corners of the sail being connected to the upper member and the midpoint of the lower member being rotatably mounted approximately amidships of the hull.

3. The sailing craft of claim 1, wherein the midpoint of the boom is further pivotably mounted approximately amidships of the hull whereby the boom may pivot above and below the plane parallel to the plane of the hull throughout the 360° rotation of said boom such that the foot of the sail may be pivotally adjusted to equalize that pressure on the side edges of the sail.

4. The sailing craft of claim 1, further having a steering means for the craft and a control means for the sail collocated ion the hull whereby one person may sail the craft.

5. The sailing craft of claim 4, wherein the steering means is at least one rudder on the craft.

6. The sailing craft of claim 4, wherein the steering means are runners on the craft.

7. The sailing craft of claim 4, wherein the steering means is at least one wheel on the craft.

8. The sailing craft of claim 1, wherein at least one stay is connected to the top of the respective mast and to the hull to provide further support for the respective mast.

9. The sailing craft of claim 1, wherein the sailing craft is a model sailing craft which is remotely controlled by radio signals.

10. The sailing craft of claim 1, wherein the sailing craft is a catamaran type sailboat, a control ring being connected to the boom whereby the pivotal and rotational movements of the sail may be controlled by a person seated on the hull.

11. The sailing craft of claim 1, wherein a crank means is attached to the boom to permit rotation of the boom such that the sail may be roller reefed about the boom.

12. The sailing craft of claim 1, wherein an outhaul is mounted on the respective ends of the boom to permit lateral movement along the boom of the first corner and the second corner of the sail.

13. A sailing craft having a hull, the hull having a bow and a stern in a longitudinal plane and an amidships between the bow and the stern, the craft comprising: a forward mast mounted near the bow of the hull, an aft mast mounted near the stern of the hull, each mast having a respective top, both masts angled inwardly wherein the top of the forward mast and the top of the aft mast are jointed at a juncture above the hull; a boom having a length, a first end, a second end, a midpoint, a first upper member and a substantially parallel second lower member, the members being connected at the respective ends of the boom, the midpoint of the boom being rotatably mounted approximately amidships of the hull, wherein the boom is disposed between the forward mast and the aft mast and may rotate about a vertical axis through 360° in a plane parallel to the plane of the hull so that the ends of the boom avoid contact with the masts; a triangular sail having side edges free of attaching means to the mast, a foot, a first corner, a second corner and a third corner, the foot of the sail being defined between the first corner and the second corner of the sail, the first corner of the sail being movable laterally, and being connected to the upper member of the boom at the first end thereof, the second corner of the sail being movable laterally and being connected to upper member of the boom at the second end thereof, the foot of the sail having a midpoint, said midpoint being substantially collocated with the midpoint of the boom, wherein the foot of the sail is disposed along the length of the upper member of the boom symmetrically about the vertical axis, the midpoint of the lower member of the boom being pivotally mounted approximately amidships of the hull whereby the boom may pivot above and below the plane parallel to the plane of the hull through the 360° rotation of said boom such that the sail may be pivotally adjusted to equalize pressure on the side edges of the sail, means for movable mounting the third corner of the sail at the juncture at the top of the masts, wherein the sail may be raised and lowered, and a crank means attached to the upper member of the boom to permit rotation of the boom such that the sail may be roller reefed about the upper member of the boom.

14. A sailing craft having a hull, the hull having a first end, a second opposite end and an amidships between the first end and the second end, the craft comprising:
    a mast having a top, the mast mounted near the first end of the hull and angled upwardly therefrom, wherein the top of the mast is approximately above the amidships of the hull, a sprit extending outwardly from the first end of the hull, a stay having a first end connected to the sprit and a second end connected to the top of the mast to support the mast, wherein the stay may be tightened and loosened to permit adjustments to the mast, a cable having a first end connected to the second opposite end of the hull and a second end connected to the top of the mast to further support the mast; a boom having a length, a first end, a second end and a midpoint, the midpoint of the boom being rotatably mounted approximately amidships of the hull, wherein the boom is disposed between the cable and the mast and may rotate about a vertical axis through 360° so that the ends of the boom avoid contact with the cable and the mast;

a triangular sail having side edges free of attaching means to the mast, a foot, a first corner, a second corner and a third corner, the foot of the sail being defined between the first corner and the second corner of the sail, the first corner of the sail being movable laterally and being connected to the first end of the boom, the second corner of the sail being movable laterally and being connected to the second end of the boom, the foot of the sail having a midpoint, said midpoint being substantially collocated with the midpoint of the boom, wherein the foot of the sail is disposed along the length of the boom symmetrically about the vertical axis, means for movable mounting the third corner of the sail to the top of the masts wherein the sail may be raised and lowered, and means for roller reefing the sail about the boom.

15. The sailing craft of claims 14, wherein the sailing craft has a stern and a bow, the first end being the stern and the second end being the bow, wherein the mast is mounted near the stern of the sailing craft.

16. The sailing craft of claim 14, wherein the sailing craft is a catamaran type sailboat.

17. A sailing craft having a hull, at least one mast mounted on the hull and a sail, the sailing craft comprising:

the sail having at least three sides and being symmetrical about a vertical center axis, the sail having an apex releasably attached to the at least one mast, the sides of the sail being free of attaching means to the mast;

a boom having a length, a first end, a second end, a midpoint, an upper member and a substantially parallel lower member, the members being connected at the respective ends of the boom; and at least one side of the sail being releasably connected to the upper member of the boom, wherein the at least one side of the sail has a midpoint which is substantially collocated with the midpoint of the boom and the at least one side of the sail is disposed along the length of the boom symmetrically about the vertical center axis.

18. The sailing craft of claim 17, wherein the sail is a triangular sail having a first corner, a second corner and a third corner, one side of the sail being defined between the first corner and the second corner of the sail, the first corner of the sail being movable laterally and being connected to the upper member of the boom at the first end thereof, the second corner of the sail being movable laterally and being connected to the upper member of the boom at the second end thereof, the one side of the sail being disposed along the length of the boom.

19. The sailing craft of claim 18, wherein the mast has a top, the third corner of the sail being releasably mounted to the top of the mast wherein the sail may be raised and lowered with respect to the top of the mast.

20. The sailing craft of claim 17, further comprising a crank means connected to the upper member of the boom whereby the upper member of the boom may be rotated such that the sail may be roller reefed about the upper member of the boom.

21. A sailing craft having a hull, the hull having a first end, a second opposite end in a longitudinal plane with the first end and an amidships between the first end and the second end, the craft comprising:

a mast having a bottom and a top, the bottom of the mast being mounted near the first end of the hull and the mast angled upwardly therefrom, wherein the top of the mast is approximately above the amidships of the hull, support means connected the top of the mast to the hull or further support for the mast; a boom having a length, a first end, a second end and a midpoint, the midpoint of the boom being rotatably mounted approximately amidships of the hull, wherein the boom is disposed between the support means and the mast and may rotate about a vertical axis through 360° in a plane parallel to the plane of the hull so that the ends of boom avoid contact with the support means and the mast;

a triangular sail having side edges free of attaching means to the mast, a bottom edge and an upper corner between the side edges, the bottom edge of the sail being connected to the boom, the bottom edge o the sail having a midpoint which is substantially collocated with the midpoint of the boom, the upper corner of the sail being releasably connected to the top of the mast wherein the sail may be raised and lowered with respect to the top of the mast.

22. The sailing craft of claim 21, wherein the support means is a second mast having a bottom and a top, the bottom of the second mast being mounted near the second ned of the hull and angling upward therefrom such that the top of the second mast is joined to the top of the mast at a juncture above the hull.

23. The sailing craft of claim 21, wherein the support means includes a sprit extending outwardly from the first end of the hull, a stay having a first end connected to the sprit and a second end connected to the top of the mast to support the mast, wherein the stay may be tightened and loosened to permit adjustments to the mast, a cable having a first end connected to the second opposite end of the hull and a second end connected to the top of the mast to further support the mast.

24. The sailing craft of claim 21, further comprising the sailing craft having a means for steering the sailing craft in a desired direction, a first control means for controlling the means for steering the sailing craft, a second control means for controlling the rotation of the boom and the sail connected thereto, both of said control means being disposed at a single location on the hull whereby the sailing craft may be sailed by a single sailor from said location.

25. The sailing craft of claim 21, further comprising the sail having a first corner and a second corner adjacent to the bottom edge of the sail, the first corner of the sail being movable laterally and being connected to the first end of the boom, the second corner of the sail being movable laterally and being connected to the second end of the boom, wherein the bottom edge of the sail is disposed along the length of the boom.

26. The sailing craft of claim 21, wherein the midpoint of the boom is further pivotably mounted approximately amidships of the hull, whereby the boom may pivot above and below the plane parallel to the plane of the hull through the 360° of rotation of the boom.

27. The sailing craft of claim 21, further comprising the boom having an upper member and a substantially parallel lower member, the members being connected at the respective ends of the boom; and bottom edge of the sail being releasably connected to the upper member of the boom.

28. The sailing craft of claim 21, further comprising a cable having a first end and a second end, the first end of the cable being connected to the top of the mast, a first segment extending to the first end of the hull and being slidably connected thereto, a second segment extending from the first end of the hull in the longitudinal plane of the hull to the second end of the hull, the second segment being slidably connected to the second end of the hull, a third segment extending to the top of the mast and terminated at the second end of the cable, the second end of the cable being connected to the top of the mast, means connected to the second segment of the cable to move the cable toward and away from the first end of the hull whereby said movement causes the top of the mast to move concomitantly to further control the sail connected to the top of the mast.

29. In a sailboat, the combination of a hull having a longitudinal midplane and further having a central vertical axis within the longitudinal midplane, a boom pivotably mounted on the hull for 360° rotation in either direction about the central vertical axis, at least one angled mast mounted on the hull, extending upwardly therefrom, and substantially within the longitudinal midplane of the hull, the at least one mast having a top portion, a sail carried by the boom, extending upwardly therefrom, and substantially symmetrical about the central vertical axis, and means for supporting the sail from the top portion of the at least one mast, such that the boom with the sail thereon has a completely free 360° rotation in either direction.

30. The sailing craft of claim 29, further comprising means for pivotal movement of the boom and the sail attached thereto, in the center longitudinal midplane of the hull through the 360° rotation of the boom.

31. The sailing craft of claim 29, further comprising stay means connecting the at least one mast to the hull for support of the at least one mast, the stay means being clear of the boom and sail and permitting the 360° rotation of said boom and sail.

32. The sailing craft of claim 29, wherein the sail is triangular.

33. A sailing craft having a boo, the boom having ends, and a sail having first and second corners, the boom comprising an upper member and a spaced-apart substantially parallel lower member, the members being connected at the respective ends of the boom, the first and second corners of the sail being connected to the upper member of the boom, and means for independently rotating the upper member, wherein the sail may be roller reefed about the upper member of the boom.

* * * * *